United States Patent
Pienaar et al.

(10) Patent No.: US 8,461,831 B2
(45) Date of Patent: Jun. 11, 2013

(54) FLOW TRACKING IN BLOCK CAVING MINING

(75) Inventors: Barend Jacobus Pienaar, Pinjarra Hills (AU); Paul J. A. Lever, Pinjarra Hills (AU)

(73) Assignee: CMTE Development Limited (AU)

( * ) Notice: Subject to any disclaimer, the term of this patent is extended or adjusted under 35 U.S.C. 154(b) by 0 days.

(21) Appl. No.: 13/231,779

(22) Filed: Sep. 13, 2011

(65) Prior Publication Data

US 2012/0074931 A1   Mar. 29, 2012

Related U.S. Application Data

(63) Continuation of application No. 12/446,840, filed as application No. PCT/AU2007/001633 on Oct. 26, 2007, now abandoned.

(30) Foreign Application Priority Data

Oct. 26, 2006  (AU) ................................ 2006905973

(51) Int. Cl.
    *G01B 7/14*  (2006.01)
(52) U.S. Cl.
    USPC .................................................. 324/207.26
(58) Field of Classification Search
    USPC ............. 324/207.11, 207.13, 207.15, 207.22,
        324/207.26, 151 R, 244, 260, 345; 299/1.05,
        299/10; 342/450, 459; 340/500, 686.1, 686.6,
        340/853.1, 854.8
    See application file for complete search history.

(56) References Cited

U.S. PATENT DOCUMENTS

| | | | |
|---|---|---|---|
| 3,868,565 A | 2/1975 | Kuipers | |
| 3,983,474 A | 9/1976 | Kuipers | |
| 4,165,480 A | 8/1979 | Morrison | |
| 4,314,251 A | 2/1982 | Raab | |
| 4,626,781 A | 12/1986 | Forkel | |
| 4,812,812 A | 3/1989 | Flowerdew et al. | |
| 5,589,775 A | 12/1996 | Kuckes | |
| 6,084,413 A | 7/2000 | Mohamed | |
| 6,736,222 B2 | 5/2004 | Kuckes et al. | |

(Continued)

FOREIGN PATENT DOCUMENTS

| | | |
|---|---|---|
| AU | 2004202247 | 12/2004 |
| CA | 2112324 | 6/1994 |
| WO | WO 2008/144811 | 12/2008 |

OTHER PUBLICATIONS

H. P. Kalmus, "A New Guiding and Tracking System", IRE Transactions on Aerospace and Navigational Electronics, (March, 19620: pp. 7-10.

(Continued)

*Primary Examiner* — Melissa Koval
*Assistant Examiner* — Daniel Miller
(74) *Attorney, Agent, or Firm* — Merchant & Gould, P.C.

(57) ABSTRACT

The invention provides a method and system for monitoring the flow of ore in block cave mining operations by inserting an active magnetic beacon 1 into an ore body 22 and generating an alternating magnetic signal with the beacon 1. The ore is monitored with a magnetometer (14, 15, 16, 17, 18) to detect the magnetic flux emitted by the beacon 1 thereby determining a position of the beacon. Successive recordings of the position of the magnetic beacon are taken as it moves along with the ore as it "caves". In this way, flow patterns of the ore may be revealed.

7 Claims, 4 Drawing Sheets

U.S. PATENT DOCUMENTS

| | | | |
|---|---|---|---|
| 7,046,002 | B1 | 5/2006 | Edelstein |
| 7,221,136 | B2 | 5/2007 | Olsson et al. |
| 2004/0223410 | A1* | 11/2004 | West et al. ................ 367/25 |
| 2005/0012499 | A1 | 1/2005 | La Rosa et al. |
| 2005/0077085 | A1 | 4/2005 | Zeller et al. |
| 2006/0170423 | A1 | 8/2006 | Kohgo et al. |
| 2007/0169542 | A1 | 7/2007 | Thornton et al. |
| 2009/0009410 | A1 | 1/2009 | Dolgin et al. |
| 2009/0114039 | A1 | 5/2009 | Schultze et al. |

OTHER PUBLICATIONS

I.R. Firth et al., "Blast Movements for Grade Control", International Society of Explosives Engineers, 2002, 2002G vol. 1.

International Search Report cited in Application No. PCT/AU2007/001633, dated Dec. 17, 2007; 5 pages.

USPTO Non-Final Office Action cited in U.S. Appl. No. 12/446,840, dated Mar. 14, 2011; 36 pages.

* cited by examiner

FLOW TRACKING IN BLOCK CAVING MINING

This application is a Continuation Application of U.S. patent application Ser. No. 12/446,840, filed Apr. 23, 2009, now abandoned which claims the benefit of National Stage Application of PCT/AU2007/001633, filed 26 Oct. 2007, which claims benefit of Serial No. 2006905973, filed 26 Oct. 2006 in Australia and which applications are incorporated herein by reference. To the extent appropriate, a claim of priority is made to each of the above disclosed applications.

FIELD OF THE INVENTION

The present invention relates generally to a method and apparatus for monitoring ore flow in mining operations.

The invention has been developed primarily for use in relation to block caving mining operations, and will be described with reference to this application. It will be appreciated, however, that the invention is not limited to this particular use and may be also adapted to monitor material flow in other underground mining applications.

BACKGROUND OF THE INVENTION

The following discussion of the prior art is provided as technical background, to enable the features and benefits of the invention to be fully appreciated in an appropriate technical context. However, any reference to the prior art should not be taken as an express or implied admission that such art is widely known or forms part of common general knowledge in the field.

Block caving is an underground mining method that may be applied to naturally fractured ore bodies. By undercutting the base of an ore body, the overlying ore is caused to cave into the opening created. The broken ore may be removed from a series of draw points, and unbroken ore continues to cave into the cavity created.

Monitoring and predicting material flow in such situations would be beneficial in terms of advanced efficiencies and subsequent cost savings however, to date, technologies for monitoring ore flow have not been particularly successful.

It is an object of the present invention to overcome or substantially ameliorate one or more of the limitations of the prior art, or at least to provide a useful alternative.

DISCLOSURE OF THE INVENTION

Accordingly, in a first aspect, the invention provides a method of monitoring the flow of ore from an ore body during block caving mining operations, said method including the steps of:
implanting a beacon in the ore body;
generating an magnetic signal with the beacon;
remotely monitoring the magnetic field in the area ore body with a magnetometer to identify the signal from the beacon; and
calculating the origin of the signal at discrete intervals to determine the path of the beacon and derive the flow of the ore as it is mined.

"Ore" is generally understood to be the ore making up the ore body, however the term "ore" as applied herein may include substantial amounts of surrounding earth and rock material.

Preferably, the signal is monitored by the magnetometer along a remote monitoring axis, said monitoring axis and said rotation axis aligned generally parallel to one another and perpendicular to said plane of rotation such that the location of the beacon can be deduced as lying on a plane orthogonal to said monitoring axis and coincident with a point of peak signal strength monitored by said magnetometer.

Preferably, the signal is monitored by the magnetometer on a remoter monitoring plane, said monitoring plane and said rotation axis aligned generally parallel to one another and perpendicular to said plane of rotation such that the location of the beacon can be deduced as lying on an axis normal to said monitoring plane and coincident with a point of peak signal strength monitored by said magnetometer.

Preferably, the first and second signals are generated on respective first and second planes of rotation by rotating the magnetic field about respective first and second rotation axes and wherein said first and second rotation axes are generally orthogonal.

Preferably, the first signal is monitored on said monitoring plane such that the location of the beacon can be deduced as the intersection between the plane orthogonal to said monitoring axis and coincident with a point of peak signal strength on said monitoring axis and, the axis normal to said monitoring plane and coincident with a point of peak signal strength on said monitoring plane.

Preferably, said second rotation axis is gravitationally aligned to be generally vertical and said second rotation axis is substantially horizontal.

Preferably, the monitoring axis is located in a vertical borehole adjacent the ore body.

Preferably, the monitoring plane is located on the surface above the ore body.

Preferably, the beacon is programmable to generate said first and second signals at distinct but generally sequential periods.

Preferably, the beacon is programmable to generate said first and second signals at predetermined intervals and for predetermined periods.

Preferably, the rotation axis is gravitationally aligned generally vertical.

Preferably, the signal is monitored by a plurality of magnetometers each moveable along a respective vertical monitoring axis disposed substantially adjacent and surrounding the ore body.

Preferably, each monitoring axis is disposed in a vertical borehole.

Preferably, at least one magnetometer monitors the strength of the signal generated by the beacon along the respective monitoring axis such that the peak signal strength depth on the monitoring axis corresponds to the origin of said signal and the depth of the beacon can be deduced.

Preferably, the position of the beacon on the horizontal plane is calculated by monitoring the relative timing of the alternating signal and calculating the phase angle between the monitoring axes with respect to the beacon.

Preferably, each magnetometer is linked to a central control unit to record and compare data from the magnetometers.

Preferably, the beacon is programmable to generate said signal at predetermined intervals and for predetermined periods.

Preferably, the magnetic field is generated by a high magnetic moment rare earth bar magnet.

Preferably, the magnetometer includes a super conducting quantum interference device (SQUID).

According to another aspect, the invention provides a self-contained beacon for implanting into an ore body during block caving mining operations, said beacon including:
a protective outer casing of a non-magnetic material; and a magnetic field generator for generating an alternating magnetic signal.

Preferably, the magnetic signal generator includes means for generating magnetic field having a polar axis, said magnetic field configured for rotation about an axis of rotation perpendicular to the polar axis of the magnet.

Preferably, the means for generating a magnetic field includes a rare earth bar magnet.

Preferably, a motor for rotating the bar magnet.

Preferably, the magnetic signal generator is mounted within a cavity defined by the outer casing.

Preferably, the magnetic signal generator is gimbal mounted within a housing.

Preferably, the gimbal is biased to align the magnetic signal generator with a first predetermined axis.

Preferably, the gimbal is gravitationally biased.

Preferably, the magnetic signal generator is located within a sphere within the cavity.

Preferably, the cavity is generally spherical and has a diameter larger than the outside diameter of the sphere.

Preferably, a damping fluid is provided in a gap between the cavity and sphere.

Preferably, the fluid is viscous oil.

Preferably, the magnetic signal generator is moveable between said first predetermined axis and an orthogonal second predetermined axis.

BRIEF DESCRIPTION OF THE DRAWINGS

Preferred embodiments of the invention will now be described, by way of example only, with reference to the accompanying drawings in which.

PREFERRED EMBODIMENT OF THE INVENTION

Figure 1:
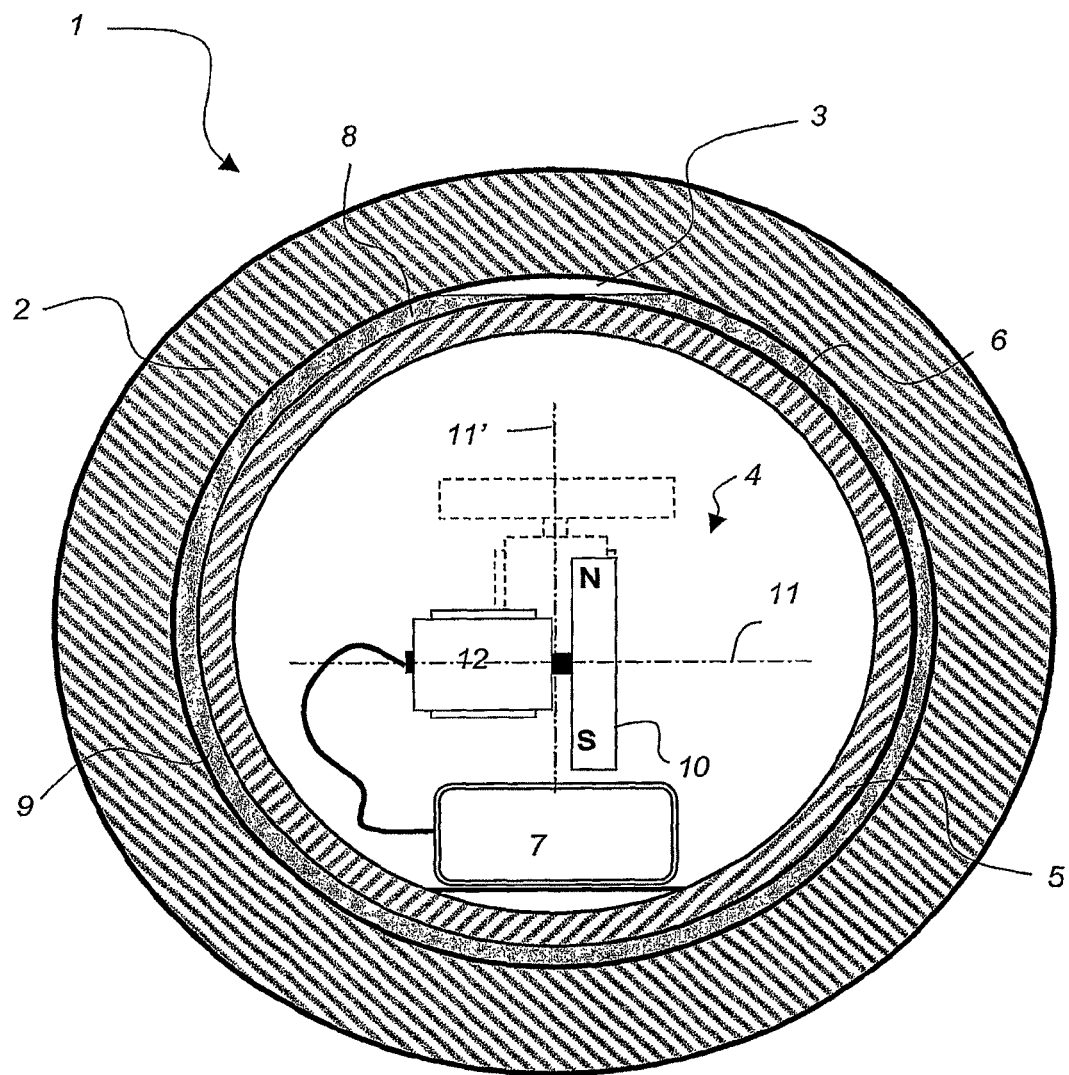
FIG. 1 is a schematic cross sectional view of a beacon in accordance with the invention.

Referring to the drawings, the invention provides a method and system for monitoring the flow of ore in block cave mining operations by inserting an active magnetic beacon into the ore body and generating a magnetic signal with the beacon. The ore is monitored with a magnetometer to detect the magnetic flux emitted by the beacon thereby determining the position of the beacon. Successive recordings of the position of the magnetic beacon are taken as it moves along with the ore as it "caves". In this way the flow patterns of the ore may be revealed.

One embodiment of beacon 1 is shown in FIG. 1. The beacon 1 has a high strength non-magnetic outer casing 2 sufficiently tough to protect a fragile internal system in an environment of moving ore, rock and earth under high pressure. The casing 2 may be manufactured from non-metal, non-electrically conductive, high strength materials such as ceramic or composite material.

While shown in the drawing as having a generally compact spherical outer form, it may be of any shape deemed suitable.

The outer casing defines an inner cavity 3 housing the magnetic field generator 4. In this embodiment, the magnetic field generator is held within an inner housing 5, itself positioned within the cavity 3 in the casing 2.

In this embodiment, the inner housing is a sphere 6 and the inner cavity in the casing correspondingly spherical in shape. The sphere 6 is weighted either by a mass 7 on one side, or by selective weight distribution of the internals. For instance, in the embodiment shown in FIG. 1, the mass 7 is also the battery for powering the electronics. In this way, regardless of the orientation of the outer casing, the inner sphere will, under the influence of gravity, align itself with the weighted side down. In this way the sphere acts as a gimbal providing a known orientation on at least one axis. Of course other types of aligning gimbal and/or gyroscopic configurations may be used without departing from the scope of the invention. For instance, a three-ring mechanical gimbal or flywheel gyroscope may be used.

The sphere 6 has an external radius less than the radius of the cavity. The difference in size provides a gap 8 between the sphere and the casing for receiving and containing a fluid. In this embodiment, the fluid is a viscous liquid 9 such as oil. This requires that both the inner sphere and outer casing can be sealed, one within the other. The fluid provides some separation between the sphere and the outer shell and acts as a lubricated bearing allowing free movement between the sphere and outer casing. In addition, the fluid provides a measure of shock damping and gimbal damping and the separation provides a degree of tolerance should the outer casing be partially deformed under pressure. Advantageously, the casing and its components are neutrally buoyant in the fluid within the outer casing to improve the damping and further reduce friction between the casing and sphere.

The beacon generates the magnetic signal by rotating a high magnetic moment rare earth bar magnet 10 about an axis 11 perpendicular to the North-South polar axis of the magnet. In this way the magnetic signal will be seen to alternate N-S when monitored on the plane of rotation. While it may be discernable from adjacent the plane of rotation, it will be strongest square to the plane.

In this embodiment, the magnet is rotated using a small synchronous motor 12. The magnet, motor and power source along with control electronics are located within the sphere. In alternative embodiments, the motor may be replaced by driving the bar magnet using pulsed coils placed around the magnet in the plane of the magnet.

The magnet has a magnetic moment in the order of 1.5 Tesla, although more powerful magnets may be used, if available.

In alternative embodiments, the bar magnet may be replaced by a magnetic field generating electromagnet and suitable electronics. In still further alternative embodiments a radial array of stationary magnetic coils may be activated sequentially to generate the appearance of a rotating magnetic field.

The rotational velocity is selected to optimise the power consumption caused by induction effects from the rotating magnet. A speed of rotation may be in the order of 10 Hz. In addition, the rotational velocity of the magnet is electronically controlled to achieve the required frequency accuracy and phase accuracy of the alternating magnetic field when viewed from a point.

In one embodiment of the invention, the rotating bar magnet and motor assembly are mounted so that the axis of rotation of the magnet may be adjusted, at least between two generally orthogonal orientations 11 and 11'. In a first orientation, with the sphere at rest and aligned with gravity, as shown in FIG. 1, the magnet is configured to rotate about a first axis which is substantially horizontal 11. Accordingly the magnet is rotating on a vertical plane. From this position, without substantially offsetting the gravitational alignment of the sphere, the axis of rotation of the magnet is adjusted to a second orientation whereby the magnet will rotate around a generally vertical axis 11' so that the magnet is rotating on a horizontal plane.

Figure 2:
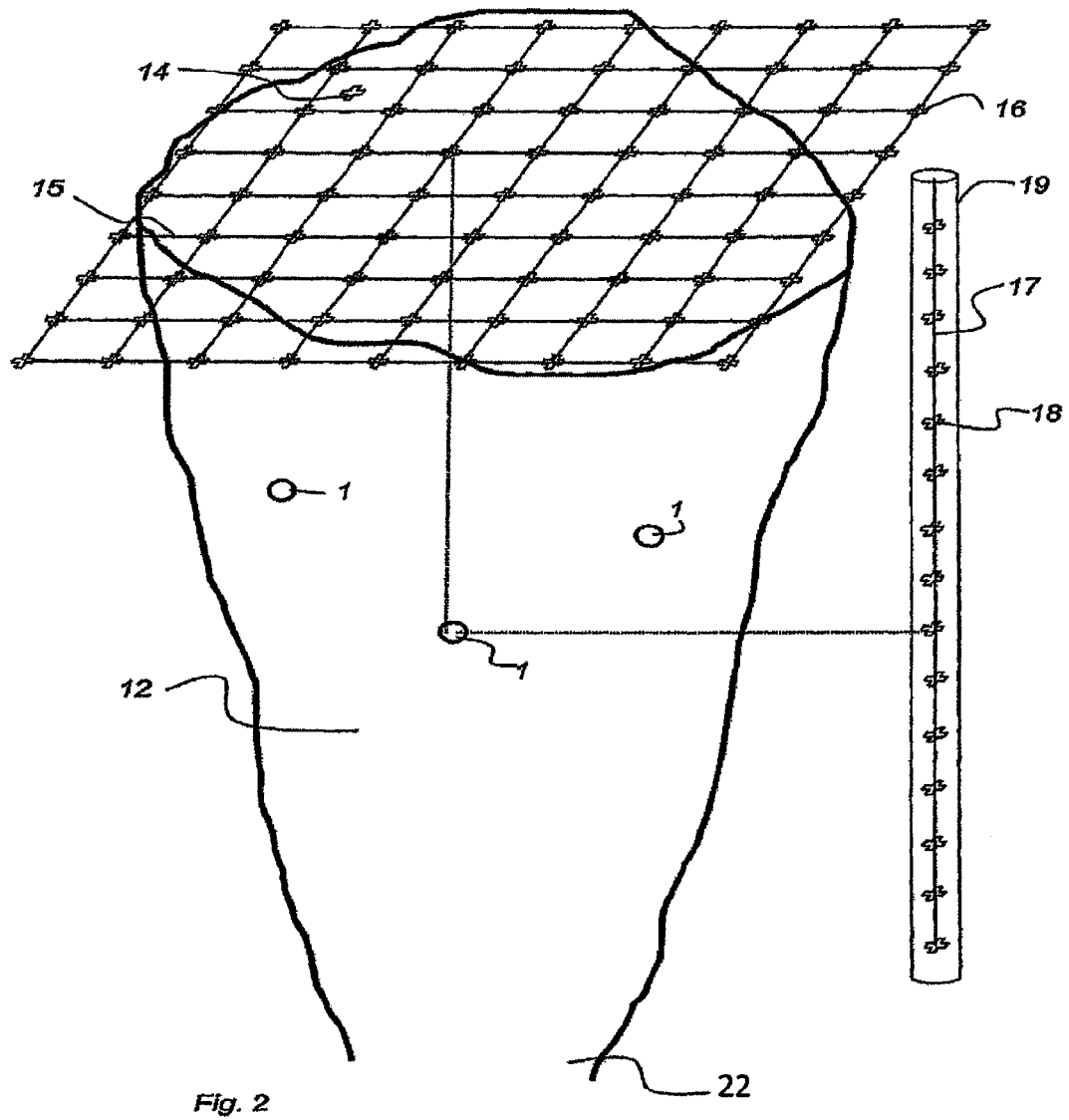
FIG. 2 is a schematic pictorial view of a system including a magnetometer array in accordance with the invention.

The schematic drawing FIG. 2, shows a fractured ore body 22 to be mining by block caving mining techniques. The base of the ore body 22 is undercut at 13 and the ore body caves into the opening created. In use, the beacon 1 is placed within the ore body 22. The beacon may be placed on top of, within or adjacent the ore body generally by drilling a vertical or horizontal bore using standard earth boring techniques.

In order to detect the very small magnetic fluctuations emitted by the beacon, the magnetometer uses lock-in amplifier technology. Lock-in amplifier technology has the ability to extract very small signals from an electrically noisy environment. It essentially acts as a very narrow band amplifier with a "Q" in the region of $10^5$.

By way of example, the magnetic field strength 100 m from a 1.5 tesla magnet is in the order of $1 \times 10^{-11}$ tesla. Using a detector coil with a diameter of 500 mm this would induce a circulating current of around 100 nano-amps (1 micro-volt) at 15 Hz.

In one simple implementation, as few as one magnetometer 14 may be used to locate the beacon. Whilst the magnet in the beacon is rotated in the first orientation, around a horizontal axis 11, (in a vertical plane) the magnetometer is used at a location above or below the ore body/beacon to determine the position of the beacon in the azimuthal plane. The position may be determined by locating at which point on the azimuthal plane the signal from the beacon is strongest. Thus, the position of the beacon can be deduced as lying on an axis normal to said azimuthal plane and coincident with a point of peak signal strength monitored by said magnetometer.

The magnet in the beacon is then switched to rotate in the second orientation, around a vertical axis and the magnetometer positioned beside the ore body can be used to locate the vertical position of peak signal strength. Accordingly the vertical position of the beacon can be deduced. Combining the known positions, a three dimensional position of the beacon can be determined By recording the position of the beacon over time, as ore flows down to the draw points, a picture of the flow can be generated, particularly it multiple beacons are used.

However, communication with the beacon is difficult whilst it is buried in the ore in the ore body meaning remote control of the orientation of the magnet is not feasible. Therefore, the beacon is pre-programmed to turn on and cycle at predetermined times for a predetermined period. A cycle may include, powering up the motor, rotating in the first orientation, reorienting the magnet to the second orientation, rotating the magnet in the second orientation, returning the magnet to the first orientation and powering down. The period between cycles is programmable and to conserve power, the bar magnet is rotated in each orientation only for a time sufficient to acquire the beacon's position.

Given that there is only a small time to determine the beacons position, from a practical point of view, it makes more sense to use an array 15 of magnetometers 16 as illustrated in FIG. 2. Here, a number of magnetometers 16 are placed above or below the ore body in a horizontal plane. The exact pattern of the magnetometers may vary, but one such method as shown in FIG. 2 the magnetometers are laid out in a grid formation. A two dimensional position of the beacon on the azimuthal plane is determined by locating the detector displaying the maximum received signal.

Once an azimuthal position is determined, the plane of rotation of the magnet is changed to the second orientation such that the magnet rotates in an orthogonal (horizontal) plane. A linear array 17 of magnetometers 18 inserted down a vertical borehole 19 may then be used to locate the beacon's vertical position. Again, combining the know positions, a three dimensional position of the beacon can be determined The position acquisition can be automated with the use of computer controllers and automated scanning techniques.

Naturally, in a large ore body it is desirable to collect flow information from multiple beacons as the mining operations progress. In such cases each beacon includes an accurate real-time clock synchronised with a master clock. Each beacon is pre-programmed to cycle at unique time-slots throughout the day, (or on multiple days) so that each beacon may be individually tracked and the generated magnetic fields of multiple beacons do not interfere with one another and confuse the readings.

Figure 3:
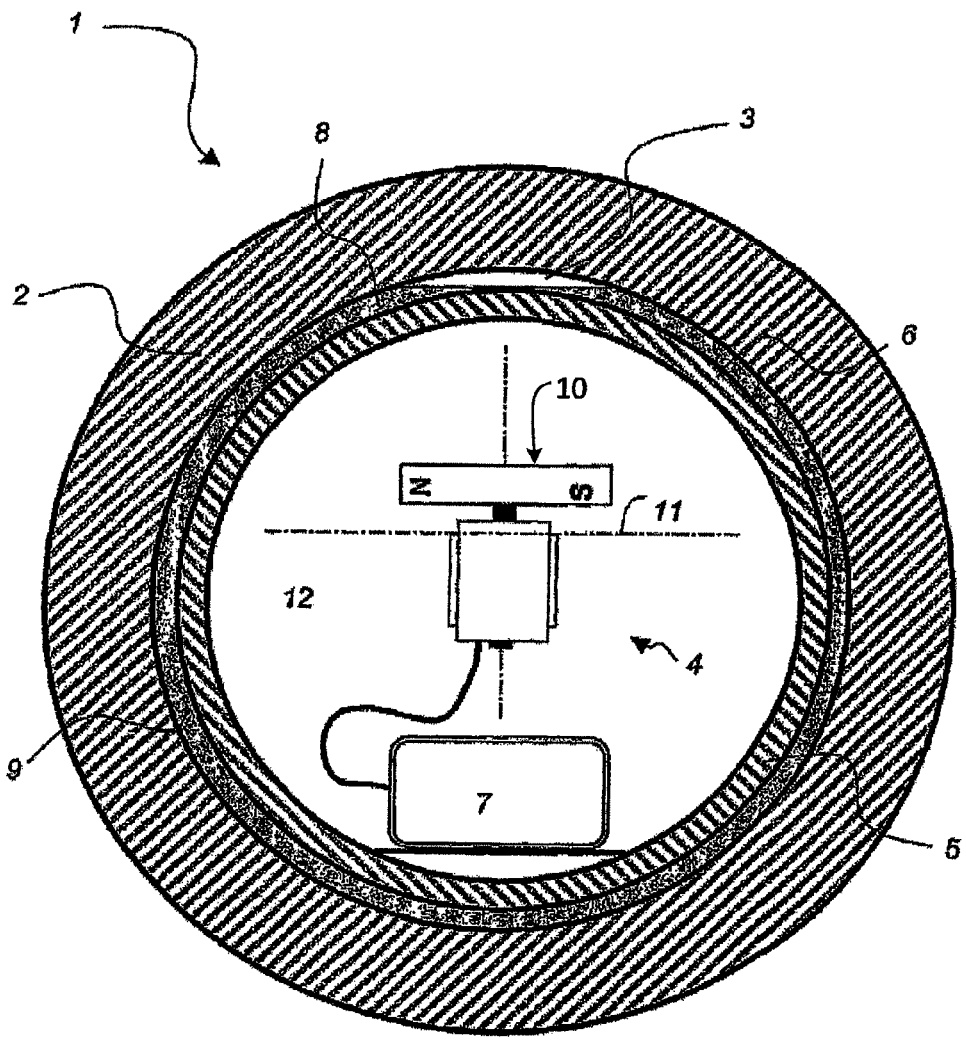
FIG. 3 is a schematic cross sectional view of a beacon in accordance with an alternative embodiment of the invention.

In an alternative system and method, the beacon does not require the ability to shift the plane of the generated magnet field between perpendicular horizontal and vertical planes. Instead, it is only necessary to generate the field on the horizontal plane, which maybe achieved by rotating the poles of the magnet about a vertical axis as previously discussed. A beacon of this type is shown in FIG. 3.

Figure 4:
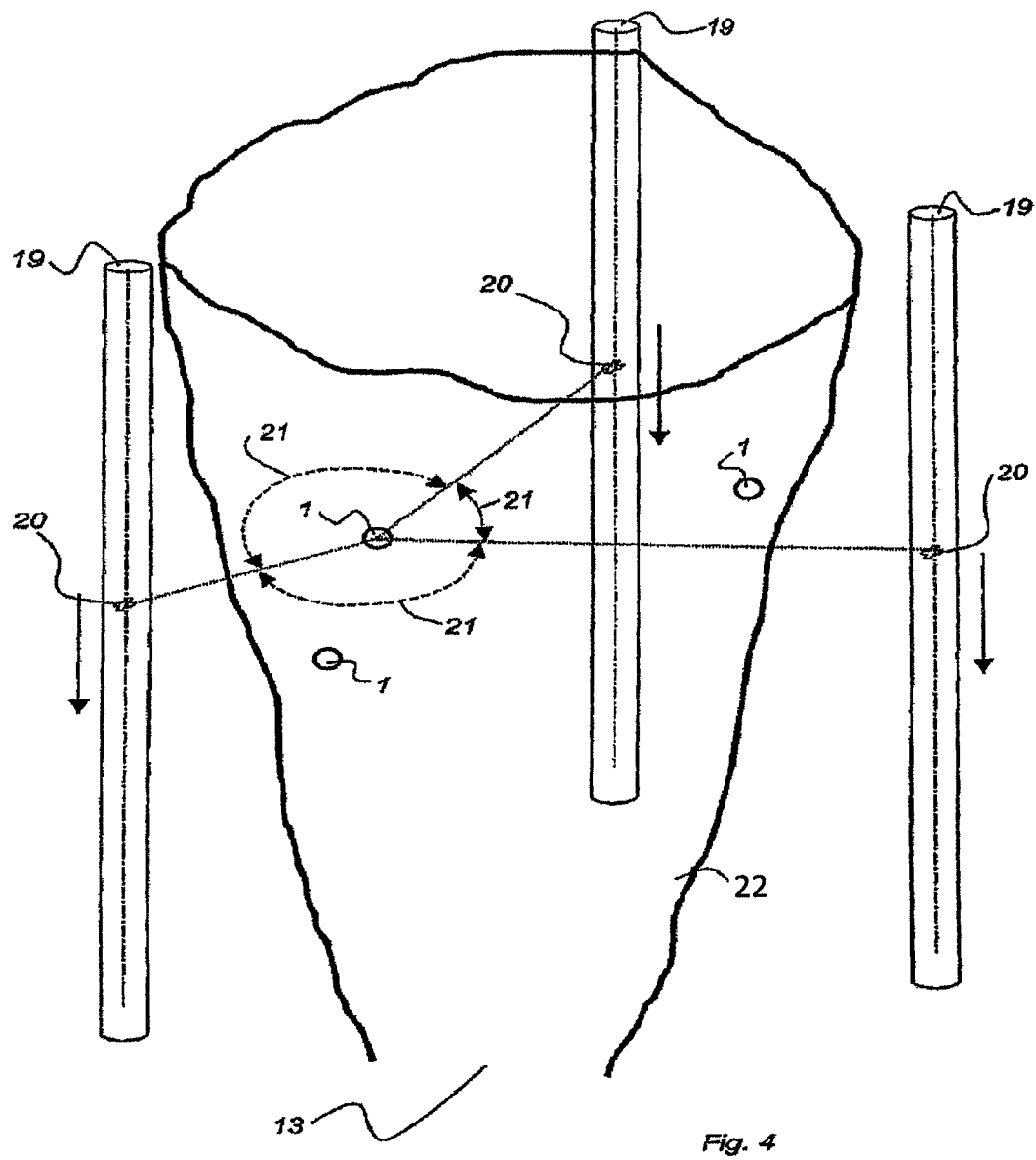
FIG. 4 is a schematic pictorial view of a magnetometer array placed in vertical boreholes around an ore body in accordance with an alternative embodiment of the invention.

As shown in FIG. 4, each beacon is placed into the ore body 22 at a selected position as previously described, however in this implementation, a plurality of boreholes 19 are drilled surrounding the ore body, preferably with even spacing.

During each beacon's 1 cycling period, magnetometers 20 are lowered gradually into each borehole 19 respectively, each scanning to record magnitude and phase measurements of the generated field as they descend. Preferably, the magnetometers are linked to descend at the same level and rates and so that the scans can be synchronised.

The vertical position of the beacon may be deduced by recording the peak signal strength as received by each magnetometer as they are progressively lowered. These peak readings should generally correspond for a given beacon, although an average may be calculated.

It is anticipated that in block caving mining operations because the ore flows under gravitational pull, the beacons are unlikely to ascend. Consequently, once the vertical position has been established during the initial scan, subsequent scans for a particular beacon may be commenced from a point based on that initial position.

For this reason while it may be possible to raise the magnetometers while scanning, it is more logical to lower them, at least for all but the initial scan.

A directional bearing to the beacon may be determined by monitoring and comparing the phase angle differences between the signals recorded by each of the magnetometers. More specifically, the relative timing of the phases as recorded by each magnetometer can be used to calculate the relative angular displacements 21 of each magnetometer with respect to the beacon and hence triangulate the position of the beacon.

In the embodiment depicted, three boreholes/magnetometers are used however, it is certainly possible to use more than three thereby achieving superior positional accuracy and or mine area coverage.

In another alternative embodiment, the arrays of magnetometers may be replaced or supplemented by one or more directionally sensitive detectors whose positions are accurately known. By each seeking a maximum magnetic field at the magnetic carrier frequency, the azimuth and elevation of a beacon can be established.

In a further alternative embodiment the magnetometer may exploit super conducting quantum interference device (SQUID) technology. SQUID technology uses a super conducting detector coil immersed in liquid nitrogen or helium in a dewer. SQUID's are capable of detecting magnetic fields with strengths in order of femto teslas ($10^{-15}$ tesla).

Since the SQUID is able to provide directional information, it is mounted on a gimbal so that it can be moved in azimuth and elevation to find the maximum magnetic field signal.

It will be appreciated that the invention provides a method and apparatus for tracking the flow of ore in block caving mining operations. The use of magnetic field generation and detection allows the invention to track objects implanted within the ore. By tracking the flow of those objects, an understanding of the flow characteristics of the mine can be achieved leading to more accurate planning and corresponding efficiencies. In these and other respects, the invention represents a practical and commercially significant improvement over the prior art.

Although the invention has been described with reference to specific examples, it will be appreciated by those skilled in the art that the invention may be embodied in many other forms.

The invention claimed is:

1. A method of monitoring a flow of ore from an ore body during block caving mining operations, said method including the steps of:

implanting a beacon in the ore body;

generating a polar alternating magnetic signal with the beacon, wherein the beacon generates the magnetic signal at predetermined intervals for predetermined periods;

monitoring a magnetic field in the ore body area with a plurality of magnetometers to identify the magnetic signal from the beacon, wherein each of the plurality of magnetometers is respectively disposed in a vertical borehole and moveable along a vertical monitoring axis disposed in the vertical borehole, wherein each vertical borehole is substantially adjacent to and surrounding the ore body;

wherein monitoring includes monitoring with the plurality of magnetometers a strength of the magnetic signal as each magnetometer is moved along its respective vertical axis to determine a location of a peak strength of the magnetic signal on the monitoring axes, and determining a depth of the beacon based on the location;

wherein monitoring includes monitoring with the plurality of magnetometers a relative timing of a phase of the magnetic signal as each magnetometer is moved along its respective vertical axis to determine a relative angular displacement of each magnetometer with respect to the beacon, and determining a position of the beacon on a horizontal plane based on the relative angular displacements; and calculating an origin of the magnetic signal at discrete intervals based on the depth of the beacon and the position of the beacon on the horizontal plane to determine a path of the beacon and derive the flow of the ore as it is mined.

2. A method according to claim 1, wherein the alternating magnetic signal is generated by rotating a magnetic field having a polar axis about a rotation axis generally perpendicular to the polar axis.

3. A method according to claim 2 wherein the rotation axis is gravitationally aligned generally vertically.

4. A method according to claim 1 wherein each of the plurality of magnetometers is linked to a central control unit, wherein the central control unit is configured to record and compare data received from the plurality of magnetometers.

5. A method according to claim 1 wherein the magnetic field is generated by a high magnetic moment rare earth bar magnet.

6. A method according to claim 1 wherein the plurality of magnetometers comprises a super conducting quantum interference device (SQUID).

7. A method of claim 1 wherein monitoring the magnetic field in the ore body area with the plurality of magnetometers moveable along the respective monitoring axis disposed substantially in the vertical borehole comprises monitoring the magnetic field in the ore body area with three magnetometers, each of the three magnetometers moveable along a respective monitoring axis disposed substantially in one of three vertical boreholes, wherein the three vertical boreholes are adjacent to and approximately equispaced around the ore body.

* * * * *